Figure 1:
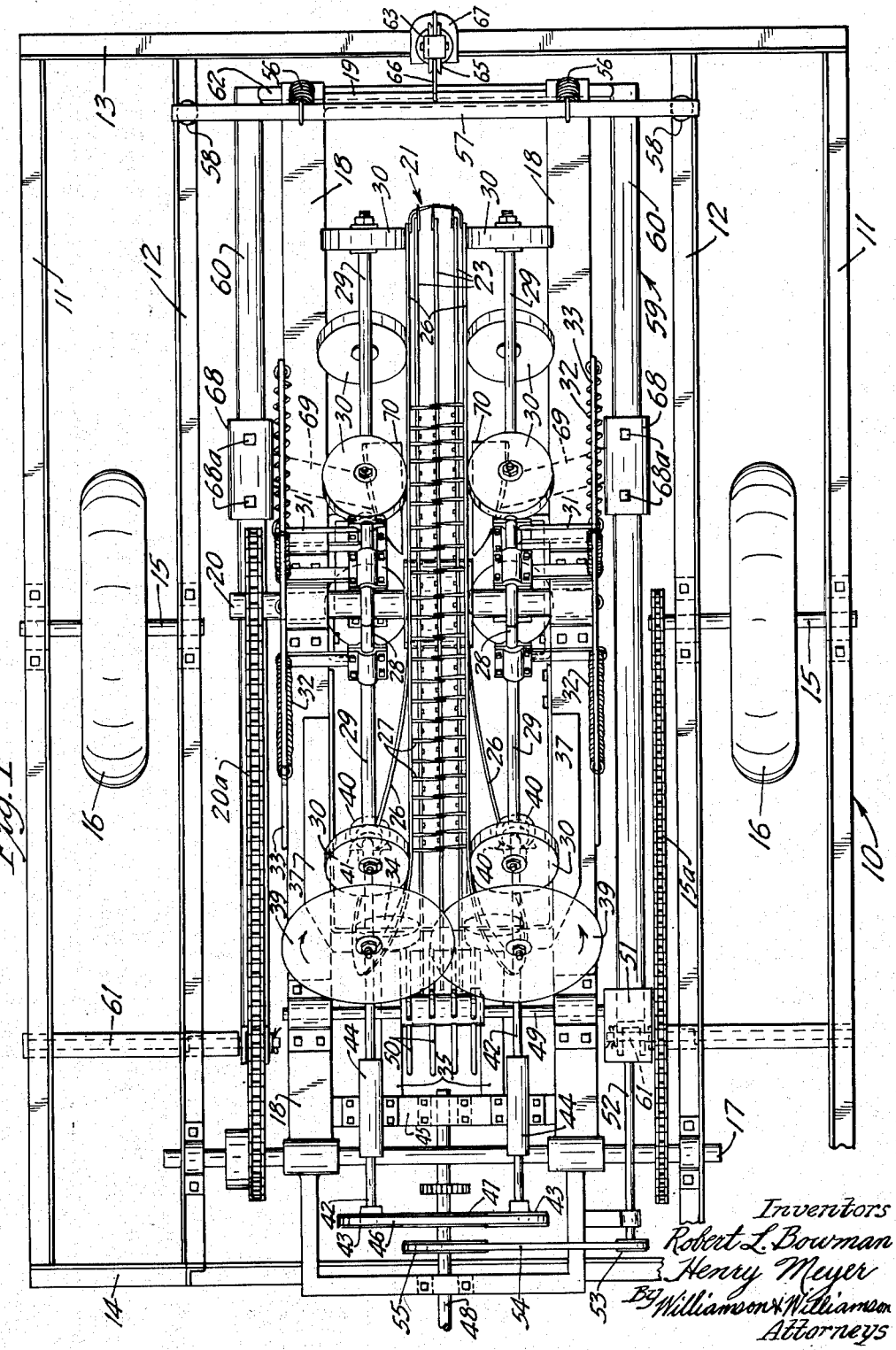

Feb. 24, 1953    R. L. BOWMAN ET AL    2,629,215
SUGAR BEET HARVESTER AND TOPPER

Filed March 2, 1949    3 Sheets-Sheet 1

Inventors
Robert L. Bowman
Henry Meyer
By Williamson & Williamson
Attorneys

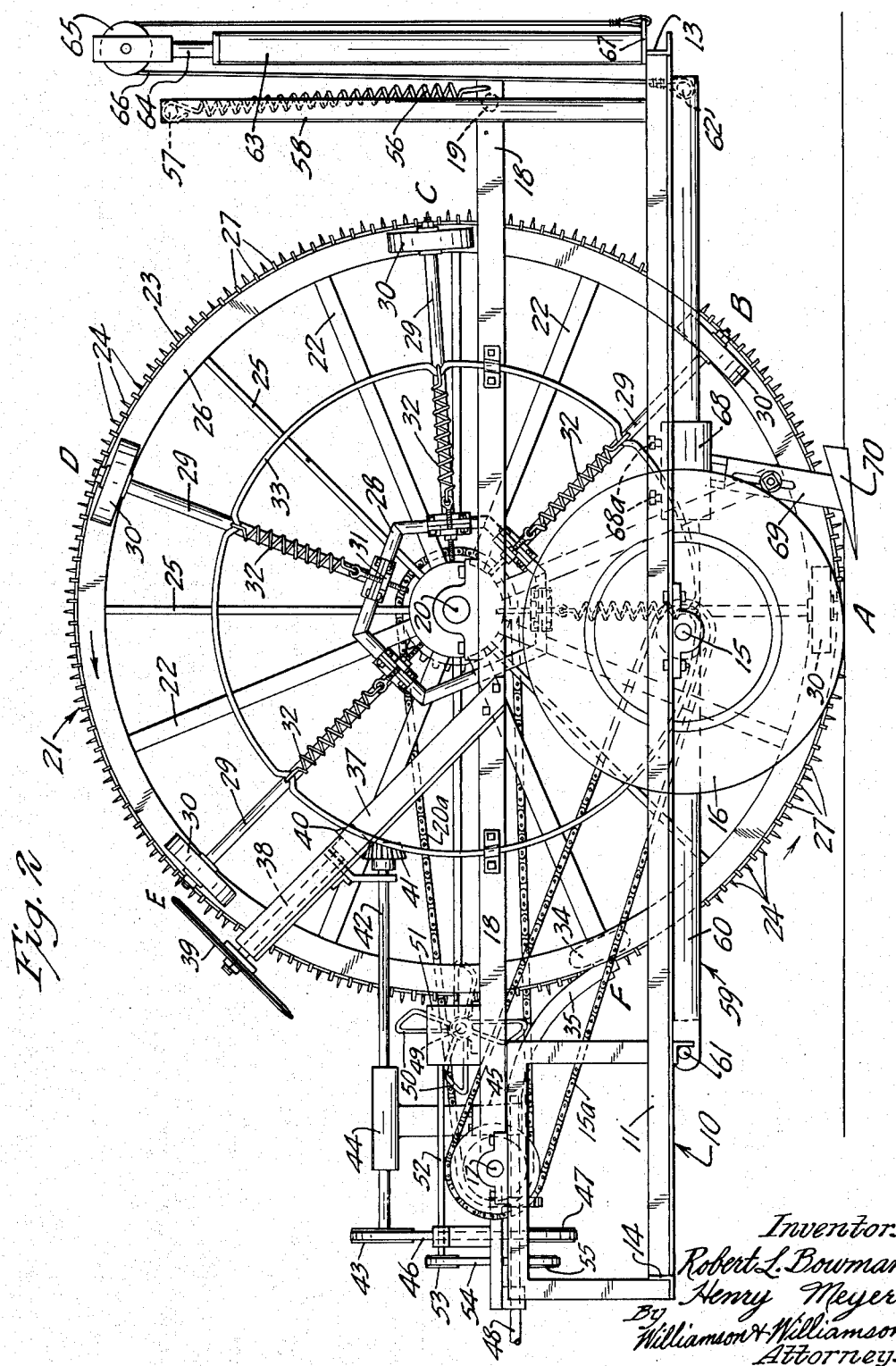

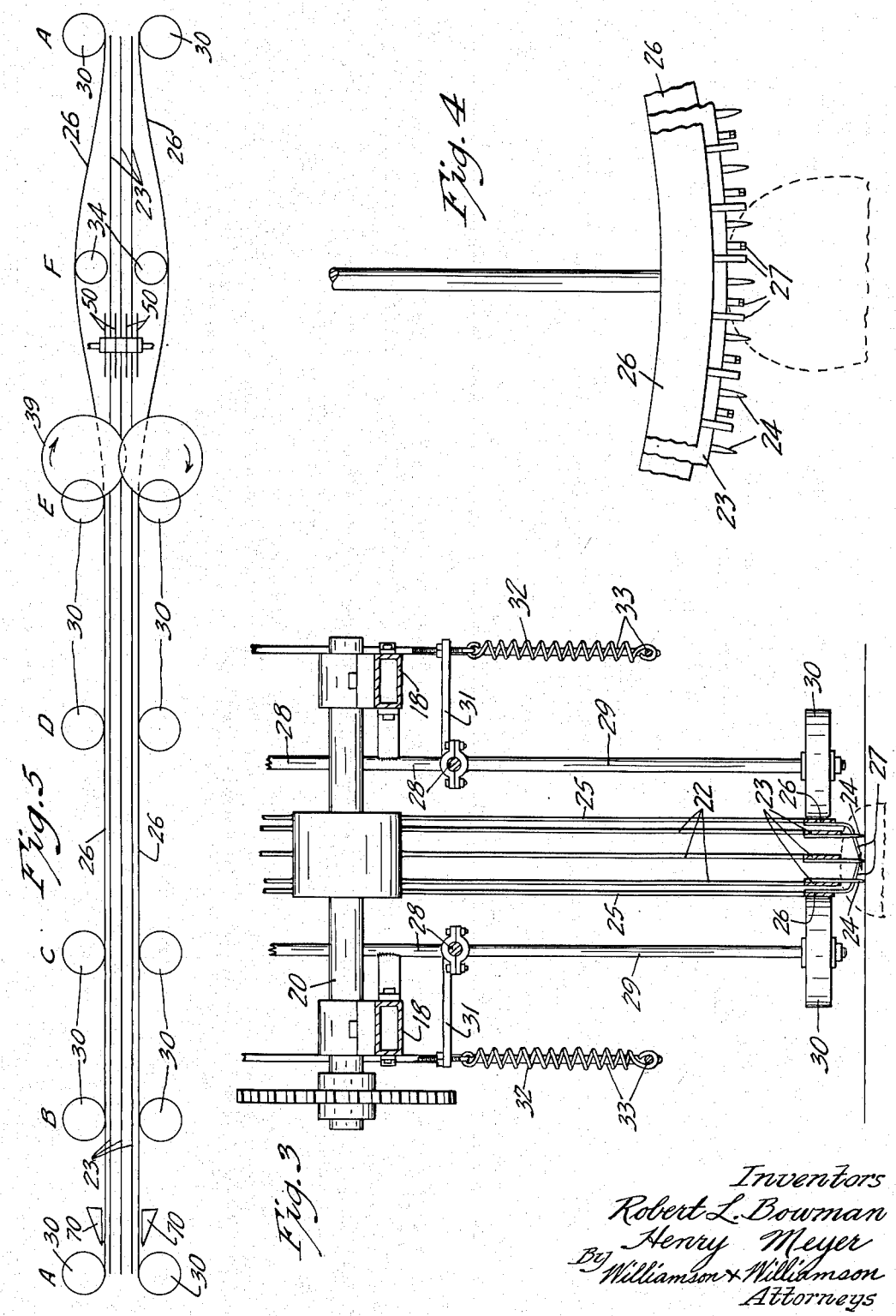

Patented Feb. 24, 1953

2,629,215

UNITED STATES PATENT OFFICE 2,629,215

SUGAR BEET HARVESTER AND TOPPER

Robert L. Bowman, Chaska, and Henry Meyer, Prinsburg, Minn.

Application March 2, 1949, Serial No. 79,276

8 Claims. (Cl. 55—108)

This invention relates to beet harvesters and more particularly to apparatus for removing sugar beets from the ground and topping them.

Sugar beets have a relatively hard crown or top portion which contain none of the sugar bearing juices which are present in the lower portions of the beet. In harvesting beets by machine it has been found difficult to secure an efficient mechanism which will remove the beets from the ground and carry them to a topping device or cutter in such a way that the hard crown is separated from the juice-bearing portion of the beet without leaving part of the crown on the juice-bearing portion or without cutting off wasteful amounts of the valuable juice-bearing portion.

In Patent No. 2,371,422 issued March 13, 1945, to Robert L. Bowman, entitled "Sugar Beet Harvester and Topper," there is disclosed means whereby this can be done. The present invention includes a beet pick-up device constructed generally in accordance with the principles disclosed in said prior patent in combination with means for more securely gripping the beet crowns so that they will be firmly held in proper position for topping and wherein the beet will be properly engaged or gripped regardless of soil conditions which might otherwise interfere with removal from the ground, and also regardless of the weight of beet.

More specifically it is an object of the invention to provide a rotary wheel-like pick-up having radially disposed beet top piercing teeth and additional beet crown engaging means which will pierce the side of the crown of the beet and prevent it from slipping from the radial teeth.

Another object of the invention is to provide improved means for cleaning the beet pick-up assembly to free it of the beet leaves which are picked up with the remainder of the plant.

A further object of the invention is to provide beet harvesting apparatus which will traverse a row of beets with the proper downward pressure to accomplish efficient removal of the beets from the ground, as the pick-up device rolls along the row.

The above and other objects of the invention will more fully appear from the following description made in connection with the accompanying drawings wherein like reference characters refer to the same parts throughout the views and in which Fig. 1 is a plan view of the apparatus. Fig. 2 is a side elevational view. Fig. 3 is an enlarged fragmentary view of a portion of the beet pick-up mechanism. Fig. 4 is an enlarged fragmentary detail of part of the mechanism shown in Fig. 3, taken at right angles thereto and Fig. 5 is a diagrammatic view of the action of the pick-up mechanism.

The machine includes a main frame 10 having outer side members 11, inner side members 12, and end members 13 and 14. Approximately midway of the length of the frame, axles 15 are mounted between the frame side members 11 and 12 and upon each of the axles is a ground wheel 16.

As viewed in Figs. 1 and 2, the left-hand end of the frame 10 is the forward or lead end thereof. Adjacent the forward end of said frame a cross shaft 17 is driven from the axle 15 by a chain 15a. The shaft 17 is mounted between the inner frame side members 12. Journaled on the cross shaft 17 are longitudinally disposed sub-frame members 18. The sub-frame members 18 are connected at their rear ends by a cross member 19.

Extending between the sub-frame members 18 approximately midway of their lengths is a cross shaft 20 driven from the cross shaft 17 by a chain 29a and upon which is mounted a large rotary wheel-like structure 21. This wheel-like structure includes a plurality of sets of spokes 22, each of which supports an annular rim 23. A plurality of radially disposed teeth 24 extend outwardly from the rims 23.

There is another set of radial spokes 25 at each side of the sets of spokes 22. Each set of said spokes 25 carries a rim 26 which is approximately the same size as the rims 23. It is preferred, however, that the outward extent of the rims 26 be slightly less than that of the rims 23. Each rim 26 supports a plurality of teeth 27 which extend inwardly toward each other and toward the teeth 24. The teeth 27 are shown to be at a slight angle to the horizontal. This angle is not critical but it is preferred that said teeth be made approximately horizontal.

As shown in Fig. 1 the teeth 27 extend between the straight radial teeth 24, for a purpose to be more fully described below.

Each of the side members 18 of the pivotally mounted sub-frame carries a polygonal support 28. On five of the sides of the support 28 are pivoted arms 29 whose outer ends carry rollers 30 which bear against the outer sides of the outer rims 26 which carry the angular teeth 27.

Each of the arms 29 has an offset portion 31, the outer end of which is connected by a tension spring 32, to a ring 33 which is connected to the sub-frame side member 18, this construction being duplicated on the other side of the wheel-like assembly 21. The tension of the springs 32 causes the rollers 30 to bear against the rims 26, thereby yieldably urging said rims and their teeth 27 inwardly toward each other and also toward the radial teeth 24 on the rims 23. The members 29, 30, 31, 32 and 33 collectively form a pressure mechanism which continuously urges the rims and their teeth toward each other and into beet-engaging position.

There is another roller 34 on each side of the wheel-assembly 21 but located inside of its respective outer rim 26. The rollers 34 are supported on bracket 35 which in turn is carried by the sub-frame side members 18. Said rollers 34 are spaced in such a way they will flex the rims 26 outwardly away from the rims 23 in the manner illustrated in Figs. 1 and 5, so that said rims 26 are spread between the sets of rollers 30 which, when viewed in Fig. 2, are positioned approximately 45 degrees to the left of the vertical and the downwardly perpendicular rollers at the lowermost point on the wheel-like structure 21.

The brackets 37 extend diagonally upwardly and forwardly from the sub-frame members 18 to points adjacent the circumference of the wheel-like structure 21. Each bracket 37 carries a shaft 38 which has a rotary cutting disc 39 thereon, each shaft 38 is connected by bevel gears 40 and 41 to a shaft 42 which is driven by a pulley 43 at its forward end. The shaft 42 is supported by a bearing bracket 44 which is mounted on a cross member 45 extending between the sub-frame side members 18. The pulleys 43 are connected by a belt 46 to a centrally located pulley 47 on a shaft 48, which is adapted for connection to the power takeoff unit on a tractor to which the apparatus is coupled for operation. The cutting discs 39 overlap and are driven in opposite directions as indicated by the arrows in Fig. 1 to provide a shearing cut and these discs constitute the beet crown topping unit.

A cross shaft 49 is journaled between the sub-frame side members 18 immediately ahead of the periphery of the wheel-like assembly 21. This shaft carries four sets of four radial arms each, said arms being shown at 50. One end of the shaft 49 extends into a gear box 51. A longitudinal shaft 52 extends forwardly from the gear box and has a pulley 53 on its forward end. This pulley is connected by a belt 54 to a pulley 55 on the central power takeoff shaft 48.

The sub-frame including the side members 18 and rear cross member 19 are swingable upwardly and downwardly about the forward cross shaft 17 which extends between the inner main frame side members 12. The wheel-like assembly 21 is adapted to roll upon the ground. Since this assembly is relatively heavy the rear end of the sub-frame is partially suspended by a pair of springs 56 which are connected between the sub-frame cross member 19 and an upper transverse member 57 which connects the upper ends of a pair of vertical posts 58 which are mounted upon the main frame inner side members 12 adjacent the rear ends thereof.

Vertical swinging movement of the sub-frame side members 18 and their connecting member 19 will cause relative movement between the wheel supported main frame 11, 12, 13, 14 and the wheel-like assembly 21 and its complementary units, namely, the rollers 30 and 34, the topping discs 39, the radial cleaning arms 50 and the rotary drive mechanism 4.

There is a lower and second sub-frame 59 whose side members 60 are pivotally supported at their front ends by stub shafts 61. The rear ends of the lower sub-frame side members 60 are connected by a cross bar 62. A hydraulic cylinder 63 extends upwardly from the center of the main frame rear cross member 13, and a piston rod 64 extends from the upper end thereof. This piston rod carries a pulley 65. A cable 66 has one end thereof connected to the base 67 of the stationary hydraulic cylinder 63. The cable extends over the pulley 65 and thence downwardly to the cross bar 62 which extends between the side members 60 of the lower sub-frame 59. By means of the hydraulic unit the sub-frame 59 can be raised or lowered relative to the main frame of the machine.

Mounted on each of the lower sub-frame side members 60 is a bracket 68 which is slidable on the frame member and may be secured by set screws 68a. Extending downwardly from the bracket 68 is a movable shank 69 carrying a shoe 70. Each shoe 70 has its pointed end directed forwardly and slants upwardly and rearwardly so that the pair of shoes will move through the ground and dig up and slightly elevate the beets in a row so that they will become impaled on the radial teeth 24 on the three rim bands 23 of the wheel assembly 21.

If desired, a conveyor (not shown) may be provided to receive the juice-bearing portions of the beets after they have been severed by the rotary disc cutters 39 and to move them laterally of the rest of the machine into a wagon-box or the beets may be permitted to drop onto the ground.

In operation, the apparatus is drawn along a row of sugar beets or the like with the large wheel assembly 21 running directly upon the beet row. The two ground penetrating blades 70 can be set relative to the ground wheels 16 to penetrate the earth any desired depth. Adjustment can be made by extending or withdrawing the piston 64 which raises or lowers the cable 66 and the lower sub-frame members 60 which support the digging blades 70. Furthermore, the blade brackets 69 can also be vertically adjusted relative to their complementary bracket members 68.

The wheel assembly 21 rests on the ground although a part of its weight is counterbalanced by the spring 56. As the wheel assembly 21 moves forward, traversing the row of beets, the radially extending teeth 24 will of course come in contact with the crowns of the beets. Referring now to Fig. 2 and Fig. 5 it can be seen that the rims 26 are spread to a maximum distance apart at the position F. Thereafter the rims 26 gradually converge toward each other as the wheel moves forwardly. At a point intermediate position F and position A the beets which normally protrude upwardly above the surface of the ground will be disposed between the laterally spread teeth 27. Thus it can be readily seen that the beets which are later to be engaged by these teeth extend upwardly between the teeth 27 and are engaged by the radially extending teeth 24 prior to reaching the position A. The further that the wheel assembly 21 turns the closer the rims 26 will be permitted to converge until it reaches position A, the ground engaging point of contact. Careful examination of Fig. 5 shows that even at position A the rims 26 have not been permitted to converge to their original positions relative to each other. Instead, they are maintained in a slightly divergent relation to each other.

As pointed out above, the beets ahead of position A will extend upwardly between the transversely extending teeth 27. As the rims 26 converge toward each other the teeth 27 will engage the crown portion of the beet and the teeth 24 will be driven inwardly and longitudinally into the beets. The weight of the wheel assembly 21 is sufficient to drive the teeth 24 their full length into the crown of the beet. By the time the beet has reached the position A it will have become firmly engaged by the co-operation of the radially extending teeth 24 and the transverse teeth 27. Thereafter the beet will be held firmly during the loosening process of the soil around it and during its line of travel around to the rotary cutting disc 39. As the wheel assembly 21 moves forward the shoes 70 loosen the dirt surrounding the beets and they are thereafter lifted by the co-operation of the teeth 24 and 27 and carried upwardly to position B. All of the beets engaged in this manner will be held in a substantially radial position relative to the wheel assembly 21 with the tip of the beet extending outwardly. As the wheel assembly 21 moves forwardly the beets will move progressively in this position adjacent the circumference of the wheel assembly to positions C, D, and E.

When the beets reach position E they are engaged by the rotating discs 39. These discs 39 cut the valuable juice bearing portions of the beet free from the crown, permitting the former to drop onto the conveyor (not shown). The crown of the beet remains engaged by the co-operating teeth 24 and 27 and is carried past the rotating discs 39 downwardly toward position F until engaged by the rotating cleaner arms 50. These cleaner arms 50 will be permitted to force the crown of the beet and any additional leaves and foliage which may have been previously held therewith free from the teeth 24 and 27, since, as best shown in Fig. 5, the rims 26 will have already been caused to diverge by the rollers 34. Thereafter the rims 26 are maintained in diverging relation by the rollers 34 until such time as that portion of the wheel assembly 21 has again passed position A. Thus it can be seen that the transversely disposed teeth 27 are in position to receive additional beets therebetween at a point intermediate positions F and A and to thereafter converge thereupon to co-operate with the teeth 24 to firmly engage these beets.

While the rollers 30 tend to maintain the outer bands 26 a constant distance from the three inner bands 23, it should be noted that the rollers are yieldably mounted so that variations in the thickness of the beets can be compensated for. The rollers 34 have no resilient movement and, therefore, will spread the bands 26 an equal distance at all times as said bands pass those rollers.

With mechanism such as disclosed it is practically impossible for a beet to become dislodged from the wheel assembly until its lower sugar-bearing portion is cut off by the discs 39 and the outer bands are expanded to withdraw them from the beet crowns approximately at the time the cleaner arms 50 drive the beet crowns from the radial prongs 24. The beets are impaled from the top as well as both side so that they are held in an extremely firm manner and can not be accidentally displaced.

As pointed out in the above identified prior patent, the radial prongs and their mountings engage the beets in such a way that the crown is severed from the beet with a minimum of waste of sugar-bearing meat, since penetration of the crowns is almost exactly uniform and the beets are presented to the topping cutters for the topping operation at the point where the hard crown and sugar-bearing portion meet.

What we claim is:

1. In a beet harvester, a rotary wheel-like beet pick-up assembly adapted to traverse a row of beets, said assembly including a portion having a plurality of radially extending pick-up teeth thereon, a pair of laterally spaced beet engaging devices supported by said assembly for rotation therewith, a beet topper supported adjacent the periphery of said pick-up assembly at a point above the ground engaging zone of said pick-up assembly, a ground shoe located below said pick-up assembly and positioned to loosen the ground beneath said assembly in the ground engaging zone thereof, at least one of said laterally spaced beet engaging devices being shiftable laterally relative to the other, mechanism associated with said shiftable beet engaging device to move the same toward and away from the other beet engaging device, said mechanism being operative to positively and continuously urge said movable beet-engaging device to a position adjacent the other beet-engaging device throughout the arc through which said devices move while passing from their initial beet-engaging position to and through topping position, and said mechanism being further operative to shift said movable beet-engaging device away from the other beet-engaging device after passing said topper.

2. The structure of claim 1 and said mechanism being further operative to maintain said pick-up devices in at least a partially separated condition in the arc of rotation of said pick-up assembly between said topper and the ground engaging zone of said assembly.

3. In a beet harvester, a rotary wheel-like beet pick-up assembly adapted to traverse a row of beets, said assembly including in combination a plurality of radially disposed sharpened beet crown piercing elements a plurality of additional sharpened beet crown piercing elements disposed at an angle to said first mentioned piercing elements and adjacent thereto and co-operatively shiftable toward and away from said first mentioned piercing elements to engage said beets in cooperation with said piercing elements during one portion of the arc of rotation of said assembly and to disengage said beets during another portion of the arc of rotation, pressure mechanism constantly urging said second mentioned piercing elements toward cooperating beet-engaging position, and a cam member positioned to cause said last mentioned piercing elements to move into non-engaging position while passing through such last mentioned portion of the arc of rotation.

4. In a beet harvester, a rotary wheel-like beet pick-up assembly adapted to traverse a row of beets, said assembly including a first series of radially extending beet crown piercing teeth, said assembly having a flexible member extending thereabout in laterally spaced relation to said first series of beet crown piercing teeth, guide structure for said flexible member which is stationary relative to said rotary wheel-like assembly, a portion of said guide structure constantly urging said flexible member closely adjacent said first series of teeth toward cooperating beet-engaging position, said guide structure having other portions thereof positioned to move said flexible member away from said first series of teeth to non-engaging position during a portion of its rotation, and a second series of co-operating teeth carried by said flexible member and directed generally parallel to the axis of rotation of said rotary assembly and toward said first series of teeth to co-operate therewith to hold said beets firmly.

5. In a beet harvester, a rotary wheel-like beet pick-up assembly including a pair of laterally spaced circular flexible bands, at least one of said bands having a series of beet top piercing teeth thereon directed toward the other of said bands, yieldable guide means for said bands constantly exerting pressure on said bands and urging them toward each other into normal co-operating beet-engaging position, and additional guide means spaced about said bands relative to said first mentioned guide means and spreading said bands and said teeth away from each other to non-engaging position during only a predetermined portion of the rotational arc of said bands.

6. The structure in claim 5 in which said guide means comprises rollers contacting said bands.

7. In a beet harvester, a rotary wheel-like beet pick-up assembly adapted to traverse a row of beets, said assembly including in combination an arcuately shaped member mounted for rotation in beet engaging position relative to said assembly and having a plurality of radially and outwardly extending teeth thereon for engaging said beets and a plurality of spaced laterally movable co-operating beet-engaging devices adjacent said teeth and adapted to engage said beets in co-operation with said teeth, said beet-engaging devices having mechanism associated therewith for positively and constantly urging the same to move toward each other and engage said beets in co-operation with said teeth during a predetermined major portion of the rotational arc of said arcuately shaped member pending topping of the beets and to move away from each other subsequent to such topping and during another predetermined portion of the rotational arc of said member thereby permitting disengagement of the tops of said beets.

8. In a beet harvester, a rotary wheel-like beet pick-up assembly adapted to traverse a row of beets, said assembly including a portion having a plurality of radially extending pick-up teeth thereon, a pair of laterally spaced beet engaging devices supported by said assembly for rotation therewith, a beet topper supported adjacent the periphery of said pick-up assembly at a point above the ground-engaging zone of said pick-up assembly, a ground shoe located below said pick-up assembly and supported thereby, at least one of said laterally spaced beet-engaging devices being shiftable laterally relative to the other, pressure mechanism positively and continuously urging said shiftable beet engaging device to a position adjacent the other beet-engaging device to cooperate therewith to firmly hold the beets and pull them upwardly as said devices leave the ground-engaging zone, a cam member supported by said assembly in position to move said beet-engaging devices away from each other into non-engaging position after passing said topper and prior to reaching beet-engaging position, said ground shoe being positioned behind the ground-engaging zone of said pick-up assembly to loosen the ground around the beets to be picked up and to urge them upwardly simultaneously with the upward beet-pulling force exerted by said beet-engaging devices.

ROBERT L. BOWMAN.
HENRY MEYER.

REFERENCES CITED

The following references are of record in the file of this patent:

UNITED STATES PATENTS

| Number | Name | Date |
| --- | --- | --- |
| 1,366,997 | Wyckoff | Feb. 1, 1921 |
| 1,367,853 | Beckwith | Feb. 8, 1921 |
| 1,763,422 | Dolling | June 10, 1930 |
| 2,371,422 | Bowman | Mar. 13, 1945 |
| 2,380,701 | Lea et al. | July 31, 1945 |
| 2,429,743 | Bingham et al. | Oct. 28, 1947 |

FOREIGN PATENTS

| Number | Country | Date |
| --- | --- | --- |
| 418,885 | Germany | Sept. 16, 1925 |